US009635629B2

(12) United States Patent
Ye

(10) Patent No.: US 9,635,629 B2
(45) Date of Patent: Apr. 25, 2017

(54) METHOD OF PERFORMING DEVICE-TO-DEVICE COMMUNICATION BETWEEN TWO USER EQUIPMENTS

(71) Applicant: ACER INCORPORATED, New Taipei (TW)

(72) Inventor: Shiang-Rung Ye, New Taipei (TW)

(73) Assignee: ACER INCORPORATED, New Taipei (TW)

(*) Notice: Subject to any disclaimer, the term of this patent is extended or adjusted under 35 U.S.C. 154(b) by 176 days.

(21) Appl. No.: 14/571,298

(22) Filed: Dec. 16, 2014

(65) Prior Publication Data

US 2015/0304973 A1 Oct. 22, 2015

Related U.S. Application Data

(60) Provisional application No. 61/980,586, filed on Apr. 17, 2014.

(30) Foreign Application Priority Data

Aug. 4, 2014 (TW) .............................. 103126634 A

(51) Int. Cl.
*H04W 56/00* (2009.01)
*H04W 74/08* (2009.01)
*H04W 72/02* (2009.01)

(52) U.S. Cl.
CPC ... *H04W 56/0015* (2013.01); *H04W 74/0816* (2013.01); *H04W 56/002* (2013.01); *H04W 72/02* (2013.01)

(58) Field of Classification Search
CPC .......... H04W 56/0015; H04W 56/001; H04W 56/002; H04W 72/02; H04W 72/04;
(Continued)

(56) References Cited

U.S. PATENT DOCUMENTS

2009/0109990 A1    4/2009  Calcev
2012/0300662 A1* 11/2012  Wang .................... H04W 72/02
                                                  370/252
(Continued)

FOREIGN PATENT DOCUMENTS

TW          201134238 A1   10/2011

*Primary Examiner* — Yemane Mesfin
*Assistant Examiner* — Peter Chen
(74) *Attorney, Agent, or Firm* — Winston Hsu; Scott Margo

(57) ABSTRACT

In a wireless communication system, a plurality of resource groups and a plurality of synchronization signals may be used to perform device-to-device communication. First monitor time associated with sending data and second monitor time associated with receiving data is determined, and each resource group is linked to a corresponding synchronization signal, a corresponding first monitor time and a corresponding second monitor time. A user equipment is configured to select a specific synchronization signal from the plurality of synchronization signals and broadcast the specific synchronization signal for claiming the corresponding resource group only after determining that the specific synchronization signal is not being transmitted by other devices at the corresponding first monitor time and the corresponding second monitor time.

8 Claims, 4 Drawing Sheets

(58) Field of Classification Search
CPC ......... H04W 72/0406; H04W 72/0426; H04W 72/0446; H04W 74/0816; H04W 76/023
See application file for complete search history.

(56) References Cited

U.S. PATENT DOCUMENTS

| | | | |
|---|---|---|---|
| 2013/0148566 A1 | 6/2013 | Doppler | |
| 2013/0272262 A1* | 10/2013 | Li | H04W 28/02 370/330 |
| 2014/0003414 A1* | 1/2014 | Choudhury | H04W 74/006 370/347 |
| 2014/0211781 A1* | 7/2014 | Kim | H04W 56/0025 370/350 |
| 2014/0355557 A1* | 12/2014 | Peng | H04W 16/14 370/330 |
| 2015/0080040 A1* | 3/2015 | Chang | H04W 48/16 455/500 |
| 2015/0264551 A1* | 9/2015 | Ko | H04W 8/005 370/329 |
| 2015/0334752 A1* | 11/2015 | Li | H04W 74/0816 455/418 |

* cited by examiner

METHOD OF PERFORMING DEVICE-TO-DEVICE COMMUNICATION BETWEEN TWO USER EQUIPMENTS

CROSS REFERENCE TO RELATED APPLICATIONS

This application claims the benefit of U.S. provisional application No. 61/980,586 filed on 2014 Apr. 17.

BACKGROUND OF THE INVENTION

1. Field of the Invention

The present invention is related to a method of performing device-to-device communication between two user equipment, and more particularly, to a method of performing device-to-device communication between two user equipment by monitoring synchronization signals using carrier sensing technology.

2. Description of the Prior Art

In a wireless communication system, two devices may communicate with each other via a base station, or directly using device-to-device (D2D) technology. The D2D technology may adopt two modes for resource allocation: network mode or client mode.

When two devices in coverage of abase station intend to perform D2D communication in the network mode, the base station is configured to allocate necessary resources to the two devices. However, if the base station is overloaded or has insufficient resources, transmission delay may influence the efficiency of D2D communication. Also, it is not possible to perform. D2D communication in the network mode when the two devices are out of coverage of the base station.

When two devices intend to perform D2D communication in the client mode, a specific resource is selected from a resource pool. Uncensored by any base station, a media access control method is required in order to avoid data collision when the two devices contend for D2D resources. Such media access control method may include, but not limited to, a carrier sense multiple access/collision detection (CSMA/CD) scheme or a carrier sense multiple access/collision avoidance (CSMA/CA) scheme. In a prior art D2D communication method, a device performs carrier sensing by monitoring data transmitted by other devices on the network, thereby lowering the chance of data collision. However, for the periodic transmission of D2D voice communications, carrier sensing is not an efficient way of resource allocation. Also, hidden node problem exists when an ad-hoc wireless communication system performs D2D communication in the client mode. Hidden node problem may cause data collision when a first device and a second device, both located out of the communication range of each other, intend to send data to a third device at the same time. Therefore, there is a need for a method of resource allocation in order to perform D2D communication with low transmission delay, high spectrum usage and high network coverage.

SUMMARY OF THE INVENTION

The present invention provides a method of performing device-to-device communication between a first user equipment and a second user equipment in a wireless communication system. The method includes providing a plurality of resource groups and a plurality of synchronization signals for use in the wireless communication system; setting first monitor time associated with sending data and second monitor time associated with receiving data; linking a first resource group among the plurality of resource groups to the first monitor time, the second monitor time, and a first synchronization signal among the plurality of synchronization signals; the first user equipment determining if the first synchronization signal is being transmitted by a third user equipment of the wireless communication system; and the first user equipment claiming the first resource group by broadcasting the first synchronization signal after determining that the first synchronization signal is not being transmitted by the third user equipment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
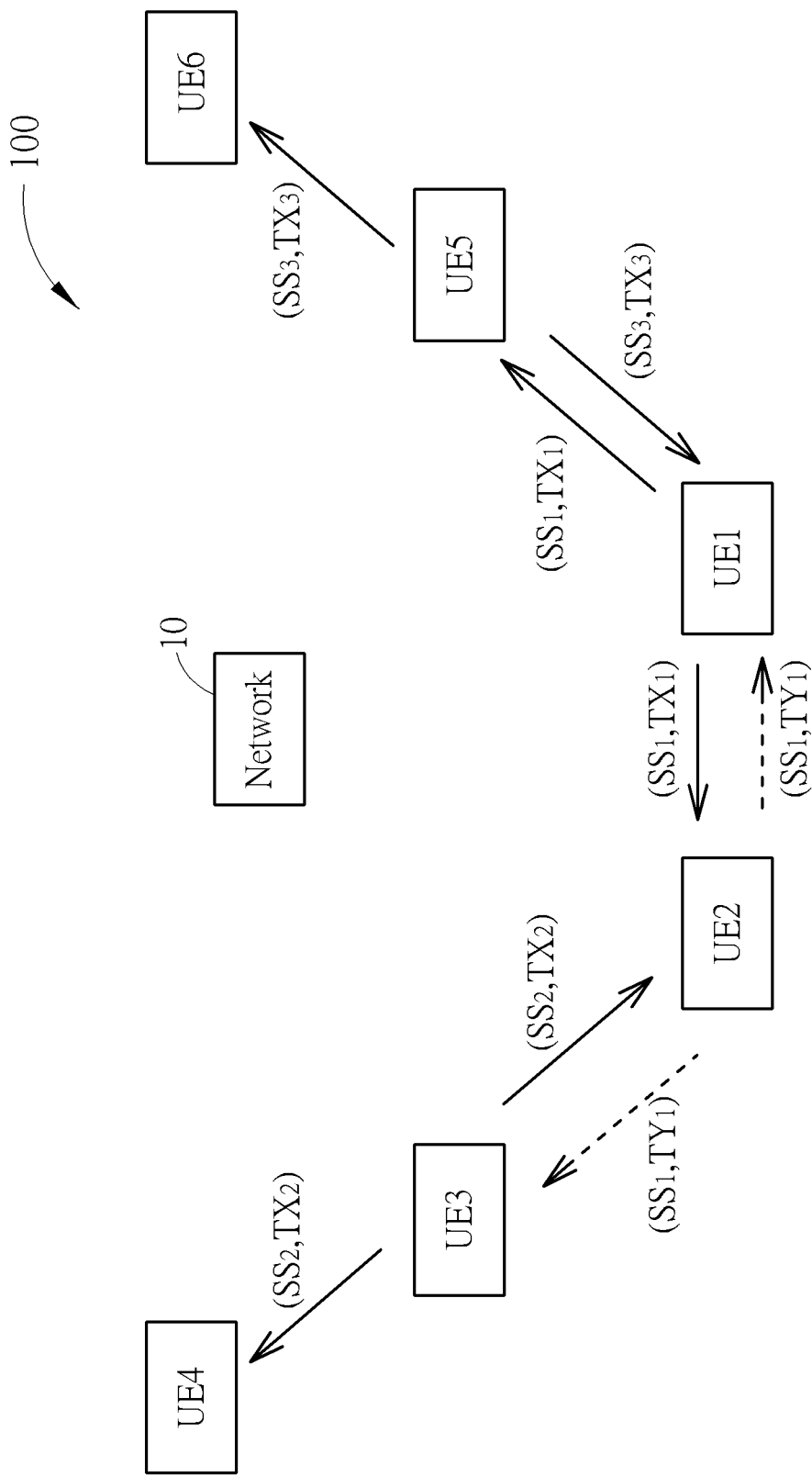
FIG. 1 is a diagram illustrating a wireless communication system according to an embodiment of the present invention.

FIG. 1 is a diagram illustrating a wireless communication system 100 according to an embodiment of the present invention. The wireless communication system 100 may preferably include a network 10 and a plurality of user equipment. The D2D communication between a transmitting user equipment and a receiving user equipment maybe initiated by the network 10 or by the transmitting user equipment. The D2D initialization process may include peer discovery, resource allocation and/or connection establishment. However, the method of performing peer discovery or establishing connection does not limit the scope of the present invention.

In FIG. 1, $SS_1 \sim SS_3$ represent the synchronization signals used by a transmitting user equipment and a receiving user equipment in the wireless communication system 100. $TX_1 \sim TX_3$ and $TY_1 \sim TY_3$ represent the points in time when the transmitting user equipment or the receiving user equipment sends a synchronization signal. The detailed operation of the wireless communication system 100 when performing D2D communication will be illustrated in subsequent paragraphs.

In an embodiment of the present invention, the network 10 may be a universal terrestrial radio access network (UTRAN) of a universal mobile telecommunications system (UMTS) and may include multiple base stations (node-B, NB). In another embodiment of the present invention, the network 10 may be an evolved UTRAN (E-UTRAN) of a long term evolution (LTE) system or an LTE-Advanced system and may include multiple evolved base stations (evolved-NB, eNB). In another embodiment of the present invention, the network 10 may be any base station of an Institute of Electrical and Electronics Engineers (IEEE) wireless communication system. However, the type of the network 10 does not limit the scope of the present invention.

In an embodiment of the present invention, each user equipment may include, but not limited to, a mobile telephone, a personal digital assistant (PDA), a handheld computer, a tablet computer, a nettop computer, or a laptop computers, or any D2D-capable portable electronic device. In another embodiment of the present invention, each user equipment may include, but not limited to, a desktop computer, a setup box, a network appliance, or any D2D-capable stationary electronic device. For illustrative purpose, 6 user equipment UE1~UE6 are depicted in FIG. 1. However, the type or the number of the user equipment does not limit the scope of the present invention.

Figure 2:
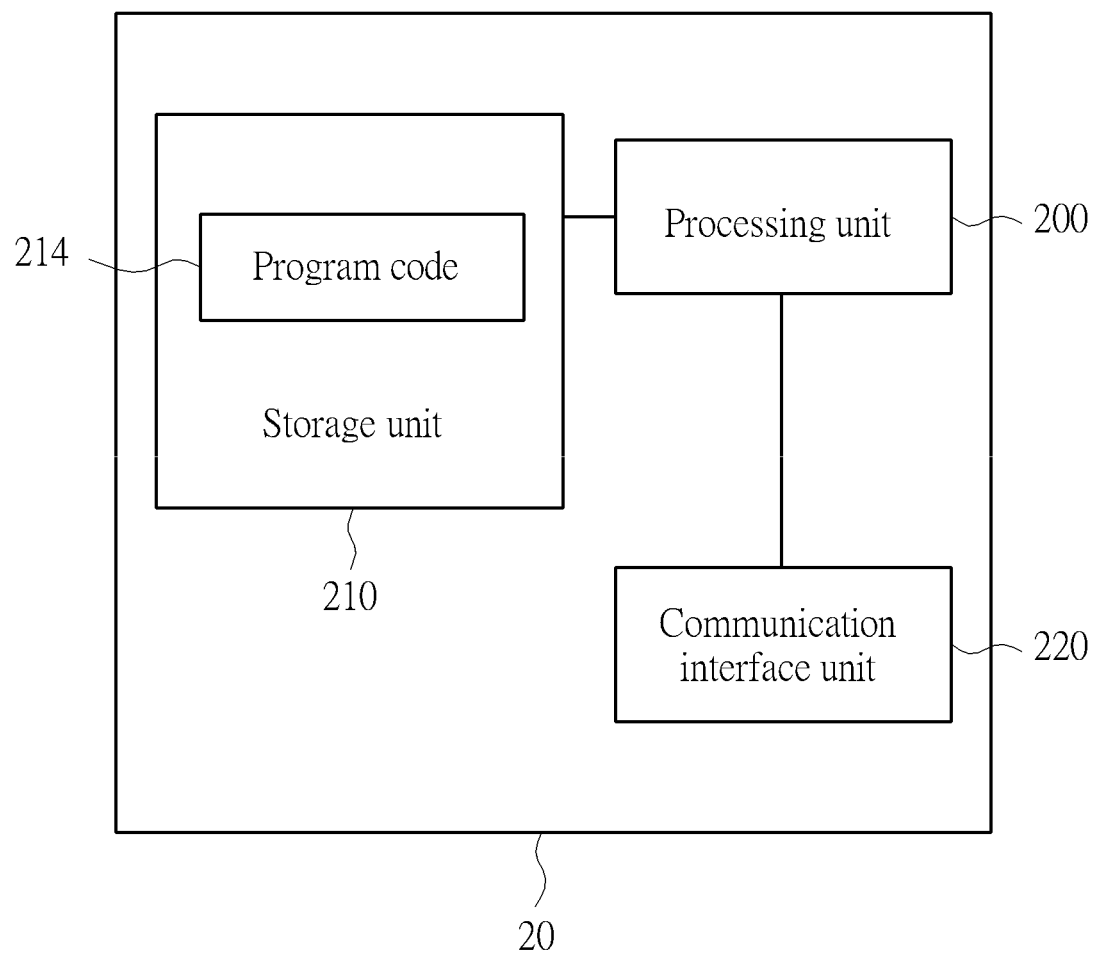
FIG. 2 is a functional diagram illustrating an electronic device according to an embodiment of the present invention.

FIG. 2 is a functional diagram illustrating an electronic device 20 according to an embodiment of the present invention. The electronic device 20, including a processing unit 200, a storage unit 210 and a communication interface unit 220, may be used to implement the user equipment UE1~UE6. The processing unit 200 may be a microprocessor or an application specific integrated circuit (ASIC). A program code 214 may be stored in the storage unit 210 and may be accessed or executed by the processing unit 200. In an embodiment of the present invention, the storage unit 210 may include, but not limited to a subscriber identity module (SIM) card, read-only memory (ROM), flash memory, random-access memory (RAM), a compact disc, a magnetic disc, a hard disc, or an optical storage device. The communication interface unit 220 may be a wireless transceiver configured to transmit or receive data during D2D communication according to the processing result of the processing unit 200.

Figure 3:
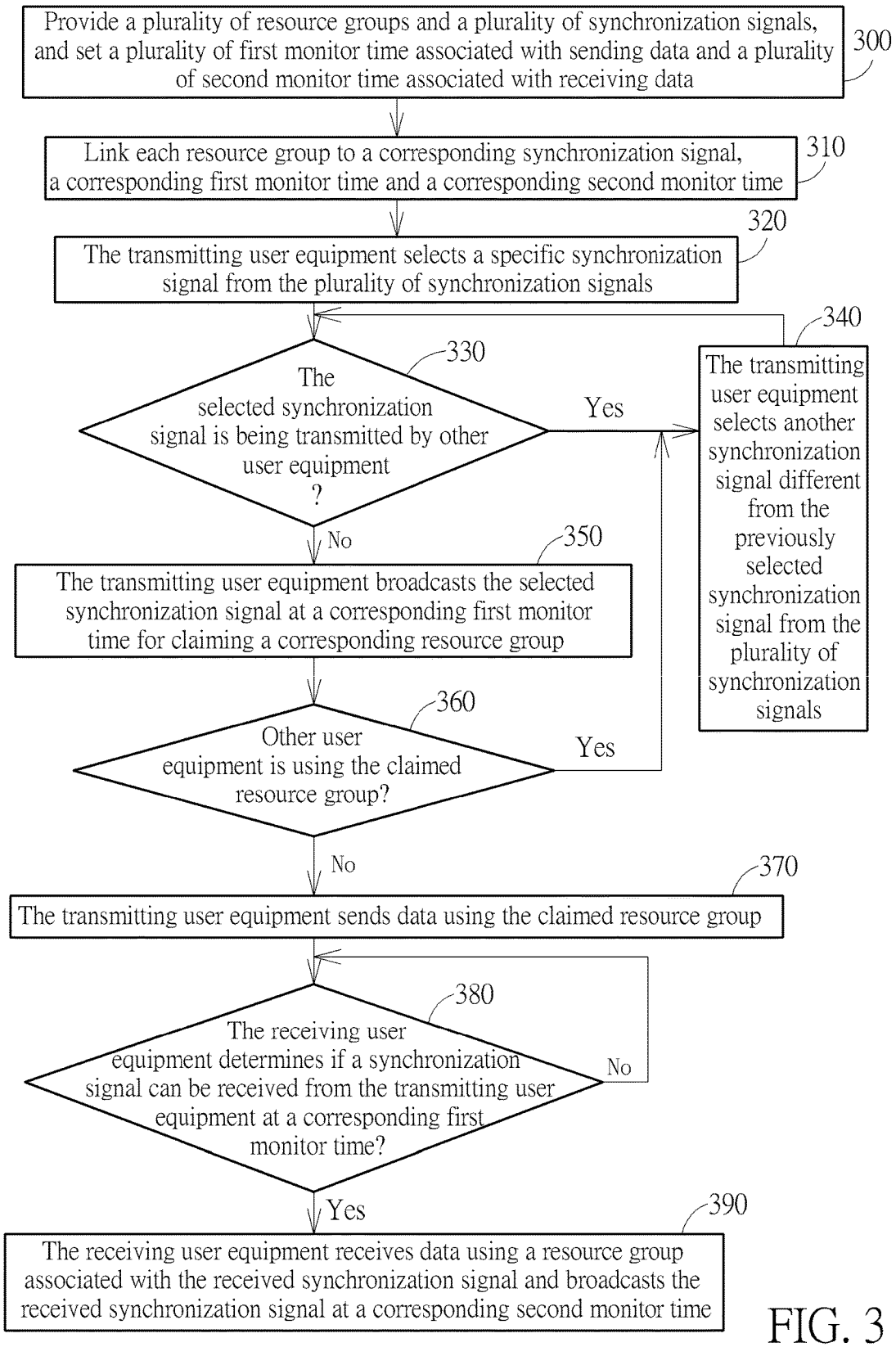
FIG. 3 is a flowchart illustrating a method of performing D2D communication between two user equipment according to an embodiment of the present invention.

FIG. 3 is a flowchart illustrating a method of performing D2D communication between two user equipment according to an embodiment of the present invention. The method depicted in FIG. 3 may be compiled into the program code 214 and includes the following steps:

Step 300: provide a plurality of resource groups and a plurality of synchronization signals, and set a plurality of first monitor time associated with sending data and a plurality of second monitor time associated with receiving data; execute step 310.

Step 310: link each resource group to a corresponding synchronization signal, a corresponding first monitor time and a corresponding second monitor time; execute step 320.

Step 320: the transmitting user equipment selects a specific synchronization signal from the plurality of synchronization signals; execute step 330.

Step 330: the transmitting user equipment determines if the selected synchronization signal is being transmitted by other user equipment; if yes, execute step 340; if no, execute step 350.

Step 340: the transmitting user equipment selects another synchronization signal different from the previously selected synchronization signal from the plurality of synchronization signals; execute step 330.

Step 350: the transmitting user equipment broadcasts the selected synchronization signal at a corresponding first monitor time for claiming a corresponding resource group; execute step 360.

Step 360: the transmitting user equipment determines if other user equipment is using the claimed resource group; if yes, execute step 340; if no, execute step 370.

Step 370: the transmitting user equipment sends data using the claimed resource group; execute step 380.

Step 380: the receiving user equipment determines if a synchronization signal can be received from the transmitting user equipment at a corresponding first monitor time; if yes, execute step 390; if no, execute step 380.

Step 390: the receiving user equipment receives data using a resource group associated with the received synchronization signal and broadcasts the received synchronization signal at a corresponding second monitor time.

In steps 300 and 310 during the D2D communication between the transmitting user equipment and the receiving user equipment in the wireless communication system 100, the synchronization signals $SS_1$~$SS_M$ may be used for synchronizing these two user equipment, the resource groups $R_1$~$R_M$ may be used for sending/receiving data, and it may be determined if other user equipment are transmitting the corresponding synchronization signals $SS_1$~$SS_M$ at the monitor time $TX_1$~$TX_M$ and $TY_1$~$TY_M$, wherein M is an integer larger than 1.

Figure 4:
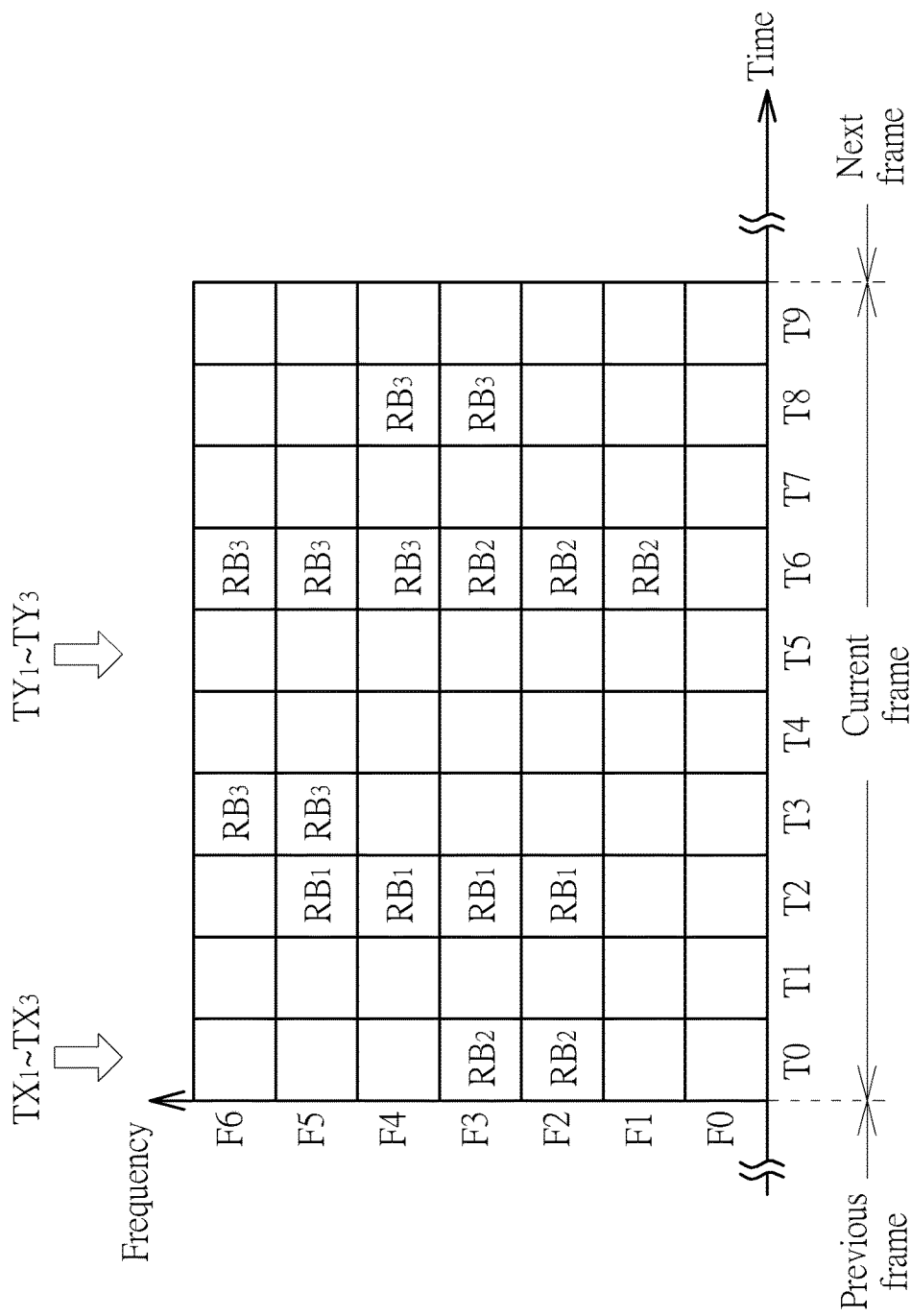
FIG. 4 is diagram illustrating the operations of D2D communication according to an embodiment of the present invention.

FIG. 4 is diagram illustrating the operations of steps 300 and 310 according to an embodiment of the present invention. The wireless communication system 100 may adopt an orthogonal frequency division multiplexing (OFDM) scheme which divides the available spectrum fragments into chunks of contiguous subcarriers known as resource blocks (RBs) in the frequency-time domain. Each resource block is the minimum unit in resource allocation and can only be allocated to a given device at a given point in time. In the embodiment illustrated in FIG. 4, the transmission period is gridded into a plurality of contiguous frames of the same length, and the transmission spectrum is gridded into a plurality of contiguous carrier bands F0~F6 of the same width. Each frame includes 10 sub-frames T0~T9. The monitor time $TX_1$~$TX_M$ and $TY_1$~$TY_M$ in each frame correspond to specific points in time during a specific sub-frame among the sub-frames T0~T9, wherein $TX_1 \ne TY_1$, $TX_2 \ne TY_2$, . . . , and $TX_M \ne TY_M$. However, the resource allocation scheme adopted by the wireless communication system 100 does not limit the scope of the present invention.

FIG. 4 depicts an embodiment of M=3 in which the wireless communication system 100 may use 3 resource groups $R_1$~$R_3$ each including one or multiple resource blocks. The resource group $R_1$ is linked to the synchronization signal $SS_1$, the monitor time $TX_1$ and the monitor time $TY_1$. The resource group $R_2$ is linked to the synchronization signal $SS_2$, the monitor time $TX_2$ and the monitor time $TY_2$. The resource group $R_3$ is linked to the synchronization signal $SS_3$, the monitor time $TX_3$ and the monitor time $TY_3$. The resource group $R_1$ includes 4 resource blocks $RB_1$ which represent the available carrier bands F2~F5 in the sub-frame T2 of each frame, respectively. The resource group $R_2$ includes 5 resource blocks $RB_2$ which represent the available carrier bands F2~F3 in the sub-frame T0 of each frame and the available carrier bands F1~F3 in the sub-frame T6 of each frame, respectively. The resource group $R_3$ includes 7 resource blocks $RB_3$ which represent the available carrier bands F5~F6 in the sub-frame T3 of each frame, the available carrier bands F4~F6 in the sub-frame T6 of each frame, and the available carrier bands F3~F4 in the sub-frame T8 of each frame, respectively.

If the monitor time $TX_1$~$TX_3$ is provided to correspond to the sub-frame T0 and the monitor time $TY_1$~$TY_3$ is provided to correspond to the sub-frame T5 in step 300, each user equipment is configured to detect whether other user equipment are transmitting the synchronization signals $SS_1$~$SS_3$ in the sub-frames T0 and T5 of each frame. In an embodiment of the present invention, the transmitting user equipment is configured to detect the synchronization signals $SS_1$~$SS_M$ linked to the resource groups $R_1$~$R_M$ at the same monitor time associated with sending data (i.e. $TX_1$= $TX_2$= . . . =$TX_M$) and detect the synchronization signals $SS_1$~$SS_M$ linked to the resource groups $R_1$~$R_M$ at the same monitor time associated with receiving data (i.e. $TY_1=TY_2= \ldots =TY_M$). In another embodiment of the present invention, the transmitting user equipment is configured to detect the synchronization signals $SS_1$~$SS_M$ linked to the resource groups $R_1$~$R_M$ at the different monitor time associated with transmitting data (i.e. $TX_1$~$TX_M$ can be of any order) and detect the synchronization signals $SS_1$~$SS_M$ linked to the resource groups $R_1$~$R_M$ at the same monitor time associated with receiving data (i.e. $TY_1$~$TY_M$ can be of any order). However, the order of the monitor time $TX_1$~$TX_M$ or the monitor time $TY_1$~$TY_M$ does not limit the scope of the present invention.

In step 320, the transmitting user equipment may select a specific synchronization signal from the plurality of synchronization signals. For example, the transmitting user equipment may select an $m^{th}$ synchronization signal from the synchronization signals $SS_1$~$SS_M$, wherein m is a positive integer and $1 \leq m \leq M$.

In step 330, the transmitting user equipment is configured to determine if the selected synchronization signal is being transmitted by other user equipment. More specifically, the transmitting user equipment is configured to detect the selected $m^{th}$ synchronization signal at the monitor time $TX_1$~$TX_M$ and the monitor time $TY_1$~$TY_M$ during each frame.

If the transmitting user equipment does not detect the selected $m^{th}$ synchronization signal sent by other user equipment at the monitor time $TX_m$ and the monitor time $TY_m$ during a first frame, it can be determined in step 330 that the $m^{th}$ synchronization signal is not being used by other user equipment for sending data or receiving data. Next, step 350 is executed so that the transmitting user equipment may claim a corresponding resource group by broadcasting the selected synchronization signal. For example, the transmitting user equipment may broadcast the $m^{th}$ synchronization signal $SS_m$ at the monitor time $TX_m$ during a second frame which occurs immediately after the first frame in order to inform other user equipment that the $m^{th}$ resource group $R_m$ has been claimed.

On the other hand, if the transmitting user equipment detects the selected $m^{th}$ synchronization signal sent by other user equipment at the monitor time $TX_m$ or the monitor time $TY_m$ during a first frame, it can be determined in step 330 that the $m^{th}$ synchronization signal is currently being used by other user equipment for sending data or receiving data. Next, step 340 is executed for selecting another synchronization signal different from the previously selected synchronization signal from the plurality of synchronization signals. For example, the value of m may be updated to any value between 1 and M except the original m. Steps 340 and 330 may be repeatedly executed until it can be determined that the selected synchronization signal is not being used by other user equipment for sending data or receiving data. Next, step 350 is executed so that the transmitting user equipment may claim a corresponding resource group by broadcasting the selected synchronization signal.

If the steps 320 and 330 are executed by two user equipment at the same time, the two user equipment may both conclude that the selected synchronization signal is currently available in step 340 and both claim the same resource group in step 350. If the two user equipment both send data using the same resource group, data collision may occur. Therefore, after claiming the $m^{th}$ resource group $R_m$ by broadcasting the $m^{th}$ synchronization signal $SS_m$ in step 350, step 360 is executed so that the transmitting user equipment can verify if other user equipment is using the $m^{th}$ resource group $R_m$. If it is determined in step 360 that the $m^{th}$ resource group $R_m$ is currently being used by other user equipment, the transmitting user equipment is configured to abandon the claimed $m^{th}$ resource group $R_m$ and select/verify another synchronization signal in steps 340 and 330. If it is determined in step 360 that the $m^{th}$ resource group $R_m$ is not being used by other user equipment, step 350 is then be executed so that the transmitting user equipment may send data using the claimed $m^{th}$ resource group $R_m$.

In step 380, the receiving user equipment is configured to determine if a synchronization signal can be received from the transmitting user equipment at a corresponding first monitor time. For example, the receiving user equipment may determine if the $m^{th}$ synchronization signal $SS_m$ can be detected at the monitor time $TX_m$ during a third frame. The third frame may be any frame that occurs after the second frame, which means the receiving user equipment is configured to periodically detect the synchronization signal during each subsequent frame. If the $m^{th}$ synchronization signal $SS_m$ can be detected at the monitor time $TX_m$ during the third frame, step 390 is then executed so that the receiving user equipment may receive data using the $m^{th}$ resource group $R_m$ and broadcast the $m^{th}$ synchronization signal $SS_m$ at the monitor time $TY_m$ during a fourth frame which occurs immediately after the third frame. This way, other user equipment can be informed that the $m^{th}$ resource group $R_m$ is currently being used for receiving data.

Reference is made to FIG. 1 and FIG. 3. If the user equipment UE1 has successfully claimed the resource group $R_1$ for sending data to the user equipment UE2, the user equipment UE1 is configured to broadcast the $1^{st}$ synchronization signal $SS_1$ to the neighboring user equipment UE2 and UE5 at the monitor time $TX_1$ in each subsequent frame during the D2D communication. After detecting the $1^{st}$ synchronization signal $SS_1$ at the monitor time $TX_1$ in a current frame, the user equipment UE2 is configured to receive data from the user equipment UE1 using the $1^{st}$ resource group $R_1$ and broadcast the $1^{st}$ synchronization signal $SS_1$ to the neighboring user equipment UE1 and UE3 at the monitor time $TY_1$ in each subsequent frame during the D2D communication. When the user equipment UE3 intends to perform D2D communication with the user equipment UE4 but detects the $1^{st}$ synchronization signal $SS_1$ at the monitor time $TY_1$ in a current frame, it can be informed that the resource group $R_1$ is currently being used for receiving data by other user equipment. Therefore, the user equipment UE3 is configured to send data to the user equipment UE4 using the $2^{nd}$ resource group $R_2$ (which may be claimed after executing steps 320-370) and broadcast the $2^{nd}$ synchronization signal $SS_2$ to the neighboring user equipment UE2 and UE4 at the monitor time $TX_2$ in each subsequent frame during the D2D communication. When the user equipment UE5 intends to perform D2D communication with the user equipment UE6 but detects the $1^{st}$ synchronization signal $SS_1$ at the monitor time $TX_1$ in a current frame, it can be informed that the resource group $R_1$ is currently being used for sending data by other user equipment. Therefore, the user equipment UE5 is configured to send data to the user equipment UE6 using the $3^{rd}$ resource group $R_3$ (which may be claimed after executing steps 320-370) and broadcast the $3^{rd}$ synchronization signal $SS_3$ to the neighboring user equipment UE1 and UE6 at the monitor time $TX_3$ in each subsequent frame during the D2D communication.

In the present invention, carrier sensing technology is used for detecting synchronization signals so that the user equipment may determine if a resource group is available for D2D communication. During the D2D communication when a specific user equipment is sending data using a specific resource group, the specific user equipment may periodically broadcast a corresponding synchronization signal for informing other user equipment that the specific resource group has been claimed and is currently unavailable, thereby preventing data collision. The specific user equipment may continuously use the specific resource group during the D2D communication without frequently performing CSMA/CD or CSMA/CA for resource allocation. After completing the D2D communication, the specific user equipment may stop broadcasting the corresponding synchronization signal, thereby releasing the specific resource group. Also, during the D2D communication when the specific user equipment is receiving data using the specific resource group, the specific user equipment may periodically broadcast a corresponding synchronization signal for informing other user equipment that the specific resource group has been claimed and is currently unavailable, thereby preventing the hidden node problem. Therefore, the present invention can provide a method of resource allocation in order to perform D2D communication with low transmission delay, high spectrum usage and high network coverage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing device-to-device (D2D) communication between a first user equipment and a second user equipment in a wireless communication system, comprising:
    providing a plurality of resource groups and a plurality of synchronization signals for use in the wireless communication system;
    setting first monitor time associated with sending data and second monitor time associated with receiving data;
    linking a first resource group among the plurality of resource groups to the first monitor time, the second monitor time, and a first synchronization signal among the plurality of synchronization signals;
    the first user equipment determining if the first synchronization signal is being transmitted by a third user equipment of the wireless communication system at the first monitor time and at the second monitor time during a first frame; and
    the first user equipment claiming the first resource group by broadcasting the first synchronization signal at the first monitor time during a second frame after determining that the first synchronization signal is not being transmitted by the third user equipment at the first monitor time and at the second monitor time during the first frame, wherein the second frame occurs immediately after the first frame.

2. The method of claim 1, further comprising:
    the first user equipment determining if the claimed first resource group is currently being used by a fourth user equipment of the wireless communication system by monitoring the plurality of resource groups after claiming the first resource group; and
    the first user equipment sending data to the second user equipment using the claimed first resource group after determining that the claimed first resource group is not being used by the fourth user equipment.

3. The method of claim 2, wherein:
    the first user equipment determines if the first synchronization signal is being transmitted by the fourth user equipment at the first monitor time during the first frame;
    the first user equipment determines if the claimed first resource group is currently being used by the fourth user equipment by monitoring the plurality of resource groups during the second frame; and
    the second frame occurs after the first frame.

4. The method of claim 2, further comprising:
    the first user equipment broadcasting the first synchronization signal at the first monitor time during each frame which occurs within a period when the first user equipment sends data to the second user equipment using the claimed first resource group.

5. The method of claim 2, further comprising:
    the second user equipment receiving data from the first user equipment using the first resource group after detecting the first synchronization signal at the first monitor time during the first frame; and
    the second user equipment broadcasting the first synchronization signal at the second monitor time during each frame which occurs within a period when the second user equipment receives data from the first user equipment using the first resource group.

6. The method of claim 2, further comprising:
    the first user equipment synchronizing with the second user equipment using the first synchronization signal before sending data to the second user equipment using the first resource group.

7. The method of claim 1, wherein the first user equipment determines if the first synchronization signal is being transmitted by the third user equipment at the first monitor time and the second monitor time during the first frame, and the method further comprising:
    setting third monitor time associated with sending data and fourth monitor time associated with receiving data;
    linking a second resource group among the plurality of resource groups to the third monitor time, the fourth monitor time, and a second synchronization signal among the plurality of synchronization signals; and
    the first user equipment determining if the second synchronization signal is being transmitted by a fifth user equipment of the wireless communication system at the third monitor time and the fourth monitor time during a second frame which occurs immediately after the first frame after determining that the first synchronization signal is being transmitted by the third user equipment at the first monitor time or the second monitor time during the first frame.

8. The method of claim 1, wherein each resource group includes one or multiple resource blocks of an orthogonal frequency division multiplexing (OFDM) scheme.

* * * * *